United States Patent
Sato et al.

(10) Patent No.: US 9,511,763 B2
(45) Date of Patent: Dec. 6, 2016

(54) DRIVE SYSTEM FOR HYBRID VEHICLE

(71) Applicant: TOYOTA JIDOSHA KABUSHIKI KAISHA, Toyota-shi, Aichi-ken (JP)

(72) Inventors: Shun Sato, Toyota (JP); Takahiko Tsutsumi, Nisshin (JP); Masayuki Baba, Toyota (JP); Toshio Sugimura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/077,693

(22) Filed: Mar. 22, 2016

(65) Prior Publication Data
US 2016/0280217 A1    Sep. 29, 2016

(30) Foreign Application Priority Data
Mar. 25, 2015    (JP) ................. 2015-062283

(51) Int. Cl.
*B60W 10/02* (2006.01)
*B60W 20/00* (2016.01)
*B60K 6/387* (2007.10)
*B60K 6/54* (2007.10)
*B60W 10/06* (2006.01)
*B60W 10/08* (2006.01)
*B60W 10/10* (2012.01)

(52) U.S. Cl.
CPC ............. *B60W 20/40* (2013.01); *B60K 6/387* (2013.01); *B60K 6/54* (2013.01); *B60W 10/02* (2013.01); *B60W 10/06* (2013.01); *B60W 10/08* (2013.01); *B60W 10/10* (2013.01); *B60Y 2200/92* (2013.01); *B60Y 2300/192* (2013.01); *B60Y 2300/421* (2013.01); *B60Y 2300/60* (2013.01); *Y10S 903/93* (2013.01); *Y10S 903/946* (2013.01)

(58) Field of Classification Search
CPC .... B60W 20/40; B60W 10/06; B60W 10/08; B60W 10/10; B60W 10/02; B60K 6/387; B60K 6/54; Y10S 903/93; Y10S 903/946; B60Y 2200/92; B60Y 2300/421; B60Y 2300/60; B60Y 2300/192
See application file for complete search history.

(56) References Cited

U.S. PATENT DOCUMENTS

2013/0157806 A1*  6/2013  Koyama ............... B60W 20/30
                                                         477/5

FOREIGN PATENT DOCUMENTS

| JP | 2013-095205 A | 5/2013 |
| JP | 2014-088091 A | 5/2014 |
| JP | 2014-184923 A | 10/2014 |
| WO | 2013/155451 A1 | 10/2013 |

* cited by examiner

*Primary Examiner* — Richard Camby
(74) *Attorney, Agent, or Firm* — Oliff PLC (57) ABSTRACT

A drive system for a hybrid vehicle includes an engine, a motor, a rotary shaft, an engine disconnect clutch, a motor disconnect clutch, an automatic transmission, and an electronic control unit. The electronic control unit is configured to, while either one of an engagement control and a rotation change control is being executed, when a request to execute the other one of the engagement control and the rotation change control has been issued, (a) delay a start timing of the other one of the engagement control and the rotation change control until execution of the one of the engagement control and the rotation change control is completed, and then (b) start execution of the other one of the engagement control and the rotation change control after execution of the one of the engagement control and the rotation change control has been completed.

14 Claims, 12 Drawing Sheets

DRIVE SYSTEM FOR HYBRID VEHICLE

INCORPORATION BY REFERENCE

The disclosure of Japanese Patent Application No. 2015-062283 filed on Mar. 25, 2015 including the specification, drawings and abstract is incorporated herein by reference in its entirety.

BACKGROUND

1. Technical Field

The disclosure relates to a drive system for a hybrid vehicle including an engine and a motor.

2. Description of Related Art

Japanese Patent Application Publication No. 2014-184923 (JP 2014-184923 A) describes a hybrid vehicle including an engine, an automatic transmission and a motor. The motor is connected to a rotary shaft that couples the engine to the automatic transmission.

When the hybrid vehicle described in JP 2014-184923 A travels by the power of the engine without using the motor, the motor is dragged by the rotation of the engine and rotates at idle, so a drag loss occurs in the motor. For the purpose of suppressing the loss, it is conceivable to newly provide a clutch (hereinafter, also referred to as motor disconnect clutch) for disconnecting the motor from the rotary shaft that couples the engine to the automatic transmission (hereinafter, also simply referred to as rotary shaft).

SUMMARY

However, if control for engaging the motor disconnect clutch and control accompanied by a change in the rotation speed of the rotary shaft (for example, shift control over the automatic transmission, or the like) are overlappingly executed, there is a concern that it is not possible to accurately synchronize the rotation speed of the motor with the rotation speed of the rotary shaft at the time of engaging the motor disconnect clutch and, as a result, a shock occurs.

The embodiments provide a drive system for a hybrid vehicle, which suppresses a shock that occurs at the time when a motor disconnect clutch is engaged in the hybrid vehicle including an engine and a motor.

One aspect provides a drive system for a hybrid vehicle. The drive system includes an engine, a motor, a rotary shaft, an engine disconnect clutch, a motor disconnect clutch, an automatic transmission, and an electronic control unit. The engine disconnect clutch is provided between the rotary shaft and the engine. The motor disconnect clutch is provided between the rotary shaft and the motor. The automatic transmission is provided between the rotary shaft and a drive wheel of the hybrid vehicle. The electronic control unit is configured to (i) execute engagement control by controlling the motor and the motor disconnect clutch so that the motor disconnect clutch switches from a disengaged state to an engaged state while causing a rotation speed of the motor to become synchronized with a rotation speed of the rotary shaft. The electronic control unit also is configured to (ii) execute rotation change control which causes a rotation speed of the rotary shaft to change. The electronic control unit also is configured to, (iii) while either one of the engagement control and the rotation change control is being executed, when a request to execute the other one of the engagement control and the rotation change control has been issued, (a) delay a start timing of the other one of the engagement control and the rotation change control until execution of the one of the engagement control and the rotation change control is completed, and then (b) start execution of the other one of the engagement control and the rotation change control after execution of the one of the engagement control and the rotation change control has been completed.

With the drive system according to the above aspect, overlapping execution of the engagement control and the rotation change control is suppressed. Thus, it is possible to accurately synchronize the rotation speed of the motor with the rotation speed of the rotary shaft at the time when the motor disconnect clutch is switched from the disengaged state to the engaged state. As a result, it is possible to suppress shock that occurs at the time when the motor disconnect clutch is switched from the disengaged state to the engaged state. The rotation change control may include at least one of control that changes a speed ratio of the automatic transmission, control that changes an engagement state of a lockup clutch provided between the rotary shaft and the automatic transmission, and control that sets an amount of change in torque of the engine to a predetermined value or a value larger than the predetermined value in a state where the engine disconnect clutch is engaged.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an embodiment will be described in detail with reference to the accompanying drawings. Like reference numerals denote the same or corresponding portions in the drawings, and the description thereof will not be repeated.

Figure 1:
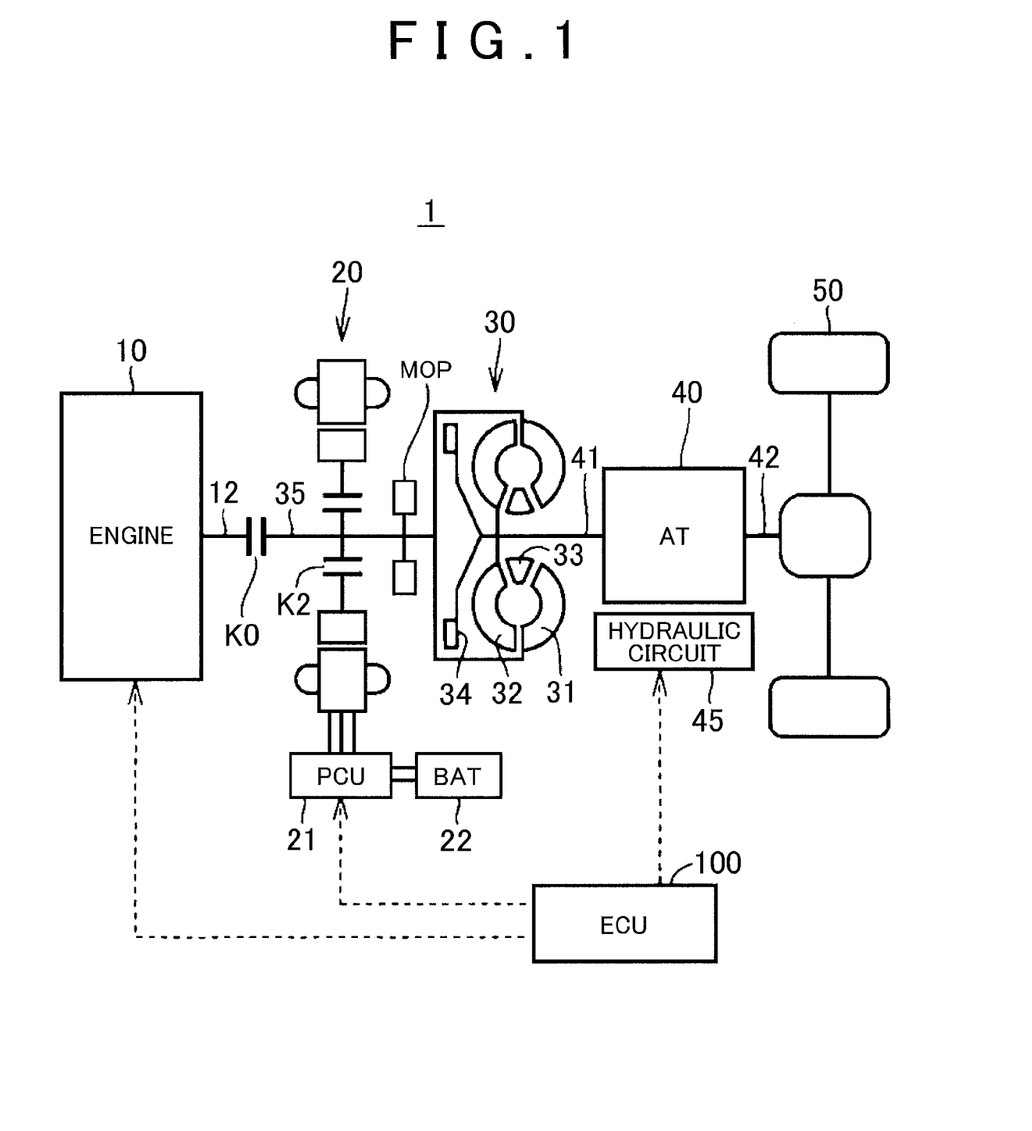
FIG. 1 is an overall configuration view of a vehicle.

FIG. 1 is an overall configuration view of a vehicle 1 according to the present embodiment. The vehicle 1 includes an engine 10, a motor generator (hereinafter, also referred to as MG) 20, a power control circuit (hereinafter, referred to as power control unit (PCU)) 21, a battery 22, a torque converter 30, an automatic transmission 40, a hydraulic circuit 45, drive wheels 50, an engine disconnect clutch K0 (hereinafter, also simply referred to as clutch K0), an MG disconnect clutch K2 (hereinafter, also simply referred to as clutch K2), and an electronic control unit (ECU) 100.

The vehicle 1 is a hybrid vehicle that travels by the power of at least one of the engine 10 and the MG 20.

A crankshaft 12 of the engine 10 is connected to a rotary shaft 35 via the clutch K0. The rotor of the MG 20 is connected to the rotary shaft 35 via the clutch K2. The rotary shaft 35 is connected to an input shaft 41 of the automatic transmission 40 via the torque converter 30. An output shaft 42 of the automatic transmission 40 is connected to the drive wheels 50.

The engine 10 is an internal combustion engine, such as a gasoline engine or a diesel engine. The MG 20 is driven by high-voltage electric power that is supplied from the battery 22 via the PCU 21. The MG 20 generates electric power when the MG 20 is rotated by power that is transmitted from the rotary shaft 35 (power that is transmitted from the engine 10 or the drive wheels 50). The battery 22 stores electric power to be supplied to the MG 20. The PCU 21 converts electric power between the MG 20 and the battery 22.

The torque converter 30 includes a pump impeller 31, a turbine runner 32, a stator 33 and a lockup clutch 34. The lockup clutch 34 is controlled to any one of an engaged state (lockup-on control state), a released state (lockup-off control state) and a half-engaged state (flex control state) on the basis of a control signal from the ECU 100.

When the lockup clutch 34 is in the engaged state, the pump impeller 31 and the turbine runner 32 rotate integrally with each other. When the lockup clutch 34 is in the released state, power is transmitted by hydraulic oil between the pump impeller 31 and the turbine runner 32, so there can be a rotation speed difference between the pump impeller 31 and the turbine runner 32 (a slip of the torque converter 30).

When the lockup clutch 34 is in the half-engaged state, power is transmitted by hydraulic oil and the lockup clutch 34 between the pump impeller 31 and the turbine runner 32. Therefore, there can be a rotation speed difference between the pump impeller 31 and the turbine runner 32; however, the difference is smaller than that in the case where the lockup clutch 34 is in the engaged state.

The automatic transmission 40 is a stepped automatic transmission that is able to selectively establish a plurality of gear positions having different speed ratios (the ratios of the rotation speed of the input shaft 41 to the rotation speed of the output shaft 42).

A mechanical oil pump MOP is connected to the rotary shaft 35. When the mechanical oil pump MOP is operated by the power of the rotary shaft 35, the mechanical oil pump MOP draws hydraulic oil stored in an oil pan (not shown) and then discharges the hydraulic oil to the hydraulic circuit 45. The hydraulic circuit 45 regulates hydraulic pressure, which is supplied from the mechanical oil pump MOP or an electric oil pump (not shown) as a source pressure, to a control hydraulic pressure (K0 pressure) of the clutch K0, a control hydraulic pressure (K2 pressure) of the clutch K2 or a control hydraulic pressure (LU pressure) of the lockup clutch 34 in response to a control signal from the ECU 100.

The vehicle 1 includes a plurality of sensors (not shown) for detecting physical quantities that are required to control the vehicle 1. The physical quantities include an accelerator operation amount, a vehicle speed, a rotation speed of the engine 10 (hereinafter, also referred to as engine rotation speed Ne), a rotation speed of the MG 20 (hereinafter, also referred to as MG rotation speed Nm), a rotation speed of the rotary shaft 35, a rotation speed of the turbine runner 32 (hereinafter, also referred to as turbine rotation speed Nt), a shift position, and the like. These sensors transmit detected results to the ECU 100.

The ECU 100 includes a central processing unit (CPU) (not shown) and a memory (not shown). The ECU 100 executes predetermined computations on the basis of information from the sensors and information stored in the memory, and controls devices of the vehicle 1 on the basis of the computed results.

For example, the ECU 100 controls the torque of the engine 10 or the torque of the MG 20 in response to the accelerator operation amount, and the like.

The ECU 100 automatically changes the gear position of the automatic transmission 40 in accordance with a predetermined shift map (shift line map) with the accelerator operation amount, the vehicle speed, and the like, as parameters. The gear position of the automatic transmission 40 may be changed in accordance with a user's manual operation when the user selects a manual shift mode by operating a shift lever. In the following description, control for changing the gear position (speed ratio) of the automatic transmission 40 by the ECU 100 is also simply referred to as shift control. The shift control includes downshift control and upshift control. In the downshift control, the gear position of the automatic transmission 40 is changed to a lower vehicle speed-side gear position. In the upshift control, the gear position of the automatic transmission 40 is changed to a higher vehicle speed-side gear position.

The ECU 100 controls the lockup clutch 34 to any one of the engaged state, the half-engaged state and the released state in accordance with a predetermined operation pattern with the accelerator operation amount, the vehicle speed, and the like, as parameters. In the following description, control for changing the state of the lockup clutch 34 by the ECU 100 is also simply referred to as lockup (LU) control.

In addition, the ECU 100 causes the vehicle 1 to travel in any one of a motor (electric) mode, a hybrid mode and an engine mode.

In the motor mode, the ECU 100 causes the rotary shaft 35 to be rotated by the power of the MG 20 by engaging the clutch K2 (connecting the MG 20 to the rotary shaft 35) and releasing the clutch K0 (disconnecting the engine 10 from the rotary shaft 35).

In the hybrid mode, the ECU 100 causes the rotary shaft 35 to be rotated by the power of at least one of the engine 10 and the MG 20 by engaging the clutch K2 (connecting the MG 20 to the rotary shaft 35) and engaging the clutch K0 (connecting the engine 10 to the rotary shaft 35).

In the engine mode, the ECU 100 causes the rotary shaft 35 to be rotated by the power of the engine 10 by releasing the clutch K2 (disconnecting the MG 20 from the rotary shaft 35) and engaging the clutch K0 (connecting the engine 10 to the rotary shaft 35). In the engine mode, the MG 20 is disconnected from the rotary shaft 35, and the MG 20 is stopped.

As described above, in the engine mode, the MG 20 is disconnected from the rotary shaft 35 and is stopped. Therefore, in the engine mode, the MG rotation speed Nm is zero, and there is a difference between the MG rotation speed Nm and the rotation speed of the rotary shaft 35. In the engine mode, the engine 10 is connected to the rotary shaft 35, so the rotation speed of the rotary shaft 35 is equal to the engine rotation speed Ne.

To change the drive mode from the engine mode to the hybrid mode, it is required to connect the MG 20 to the rotary shaft 35 by engaging the clutch K2. However, there is a difference between the MG rotation speed Nm and the rotation speed of the rotary shaft 35 as described above in the engine mode, so there is a concern that the MG rotation speed Nm steeply changes toward the rotation speed of the rotary shaft 35 at the time when the clutch K2 is engaged and, as a result, a shock due to inertia energy (engagement shock) occurs. In addition, electric power generated by or consumed by the MG 20 steeply increases as a result of a steep change in MG rotation speed Nm, and overcurrent flows through the battery 22, so there is a concern that the battery 22 degrades.

Therefore, at the time when the drive mode is changed from the engine mode to the hybrid mode, the ECU 100 does not only engage the clutch K2, but engages the clutch K2 by increasing the K2 pressure while executing feedback control over the torque of the MG 20 such that the MG rotation speed Nm becomes synchronous with the rotation speed of the rotary shaft 35. Hereinafter, this series of controls is also referred to as K2 engagement control.

Figure 2:
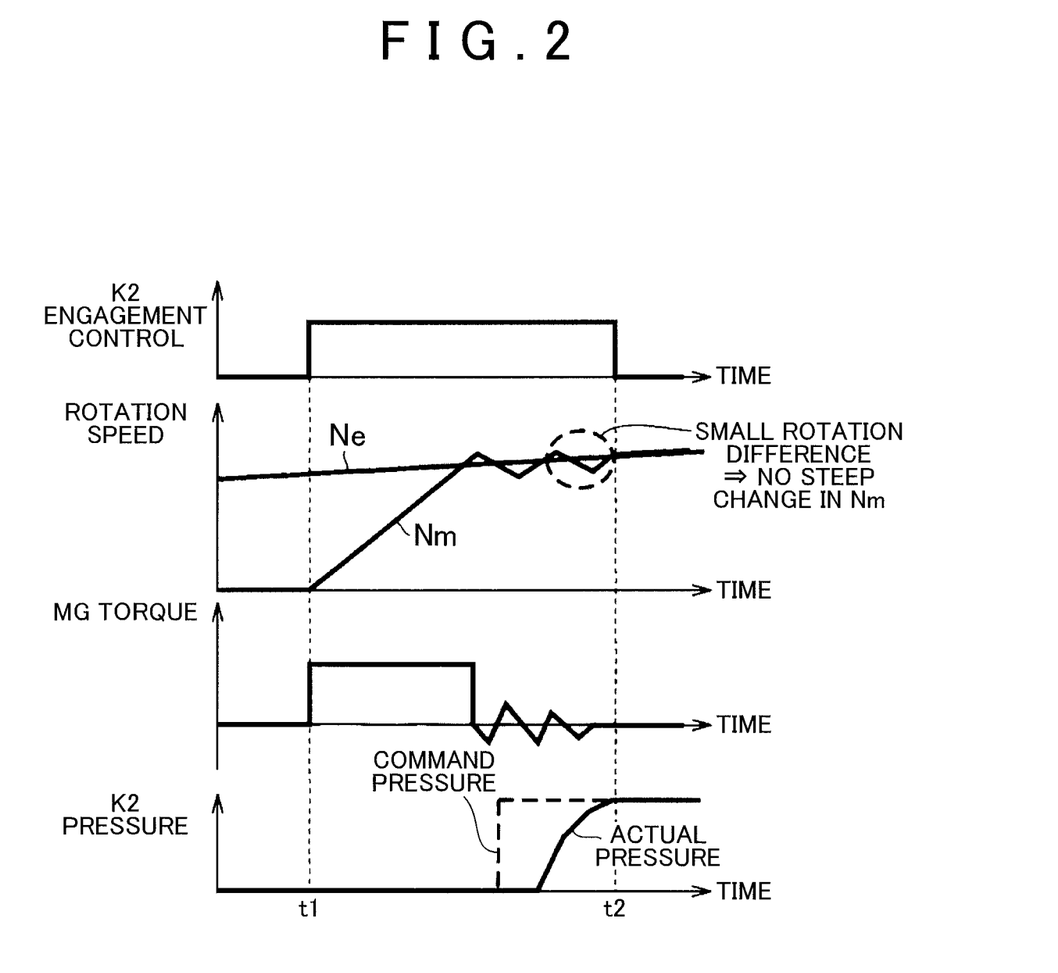
FIG. 2 is a time chart that shows an example of changes in MG rotation speed Nm, and the like, resulting from K2 engagement control.

FIG. 2 is a time chart that shows an example of changes in MG rotation speed Nm, and the like, resulting from K2 engagement control. Before time t1, the drive mode is the engine mode, so the MG 20 is disconnected from the rotary shaft 35, the MG rotation speed Nm is zero, and there is a difference between the MG rotation speed Nm and the engine rotation speed Ne (the rotation speed of the rotary shaft 35).

When a request to change the drive mode to the hybrid mode (that is, engage the clutch K2) is issued at time t1, the ECU 100 starts K2 engagement control. Specifically, the ECU 100 initially starts the process of executing feedback control over the torque of the MG 20 such that the MG rotation speed Nm becomes synchronous with the engine rotation speed Ne (the rotation speed of the rotary shaft 35) (hereinafter, also referred to as Nm synchronization control).

When the difference between the MG rotation speed Nm and the engine rotation speed Ne becomes smaller than a predetermined value as a result of Nm synchronization control, the ECU 100 starts engaging the clutch K2 by increasing a command pressure of the K2 pressure while continuing Nm synchronization control. At this time, because the difference between the MG rotation speed Nm and the engine rotation speed Ne is extremely small as a result of Nm synchronization control, the MG rotation speed Nm does not steeply change as the clutch K2 engages. Therefore, occurrence of the above-described engagement shock or overcurrent is suppressed.

When an actual pressure of the K2 pressure increases to the command pressure and the clutch K2 is completely engaged (the MG 20 is connected to the rotary shaft 35) at time t2, the ECU 100 ends K2 engagement control. Thus, a change into the hybrid mode is completed.

Improvement in Controllability of K2 Engagement Control (Nm Synchronization Control)

As described above, at the time when the ECU 100 according to the present embodiment executes K2 engagement control, the ECU 100 suppresses a shock at the time of engagement of the clutch K2 by executing Nm synchronization control.

However, if Nm synchronization control for synchronizing the MG rotation speed Nm with the rotation speed of the rotary shaft 35 and control accompanied by a change in the rotation speed of the rotary shaft 35 (hereinafter, also referred to as rotation change control) are overlappingly executed, there is a concern that the control accuracy of Nm synchronization control decreases and, as a result, the MG rotation speed Nm steeply changes at the time when the clutch K2 is engaged.

The rotation change control is, for example, the above-described shift control (control for changing the gear position of the automatic transmission 40). When shift control is executed, the rotation speed of the input shaft 41 of the automatic transmission 40 changes to a rotation speed that is determined by the vehicle speed and the speed ratio after shift control. Because the input shaft 41 of the automatic transmission 40 is connected to the rotary shaft 35 via the torque converter 30, the rotation speed of the rotary shaft 35 (engine rotation speed Ne) also changes with a change in the rotation of the input shaft 41 of the automatic transmission 40. Therefore, in the present embodiment, the case where shift control is set as rotation change control will be described.

Figure 3:
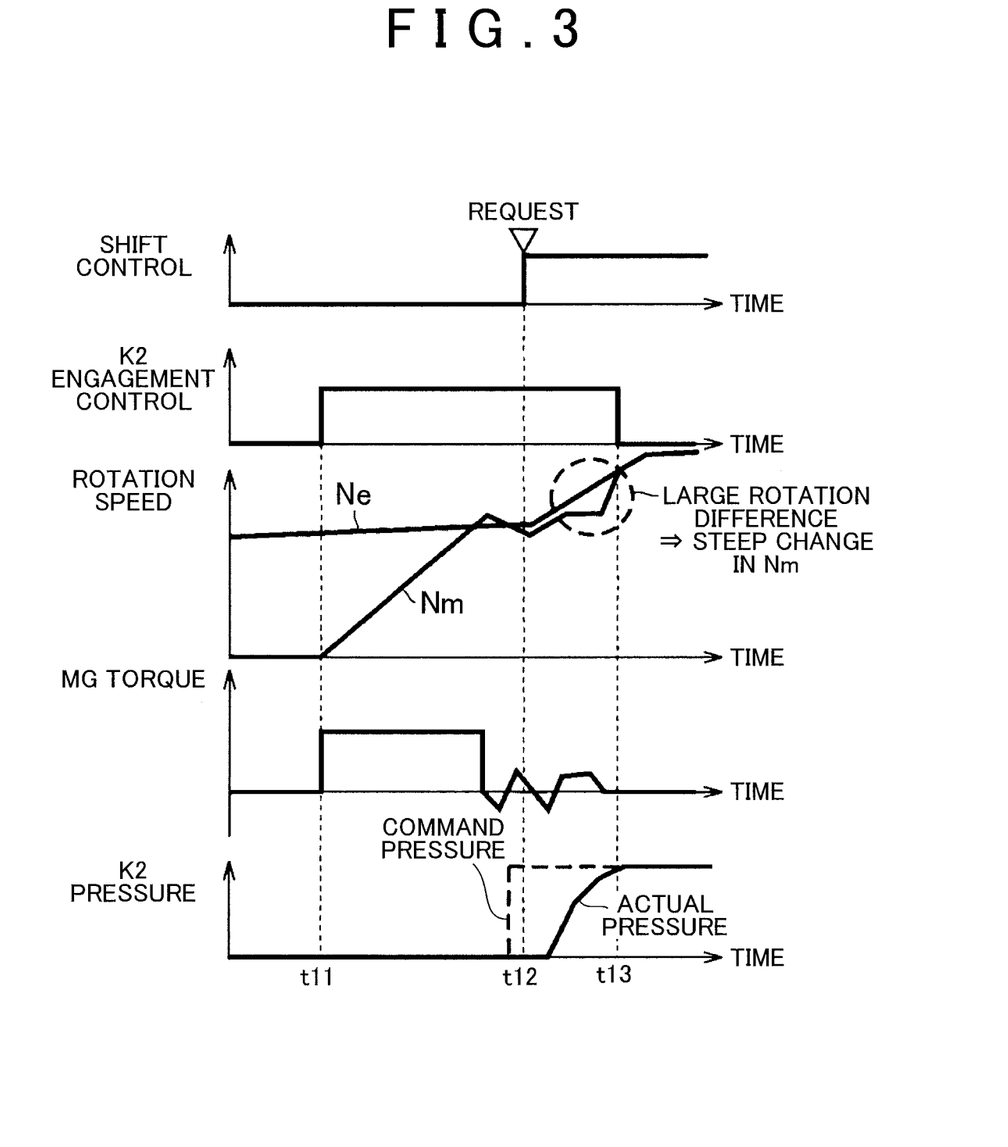
FIG. 3 is a first time chart that shows a comparative embodiment.

FIG. 3 is a time chart that shows an example of changes in MG rotation speed Nm, and the like, in the case where shift control (rotation change control) is executed while K2 engagement control is being executed as a comparative embodiment. FIG. 3 shows the case where downshift control is executed as shift control.

When K2 engagement control is started at time t11, the MG rotation speed Nm begins to increase toward the engine rotation speed Ne under Nm synchronization control. However, when shift control is executed at time t12 at which K2 engagement control is being executed (before engagement of the clutch K2), the engine rotation speed Ne that is a target value of Nm synchronization control changes (increases) under shift control, so the control accuracy of Nm synchronization control decreases. That is, it becomes difficult to synchronize the MG rotation speed Nm with the engine rotation speed Ne, so the difference between the MG rotation speed Nm and the engine rotation speed Ne increases. As a result, there is a concern that the MG rotation speed Nm steeply changes at the time when the clutch K2 is engaged and, as a result, the above-described engagement shock or overcurrent occurs.

In order to suppress such an inconvenience, when either one of K2 engagement control and shift control (rotation change control) is being executed, the ECU 100 suppresses execution of the other one of K2 engagement control and shift control (rotation change control). In the present embodiment, while one of K2 engagement control and shift control is being executed, when a request to execute the other one of K2 engagement control and shift control has been issued, the start timing of the other one of K2 engagement control and shift control is delayed until execution of the one of K2 engagement control and shift control is completed, and then execution of the other one of K2 engagement control and shift control is started after completion of execution of the one of K2 engagement control and shift control. Thus, the controllability of K2 engagement control (Nm synchronization control) is improved, and occurrence of the above-described engagement shock or overcurrent is suppressed. This is the most characteristic point of the present embodiment.

In the following description, the case where execution of one of K2 engagement control and shift control has fully completed and then the other one of K2 engagement control and shift control is started will be described. However, as long as it is possible to ensure the controllability of K2 engagement control (Nm synchronization control), before execution of one of the controls is fully completed, the other one of the controls may be started.

Figure 4:
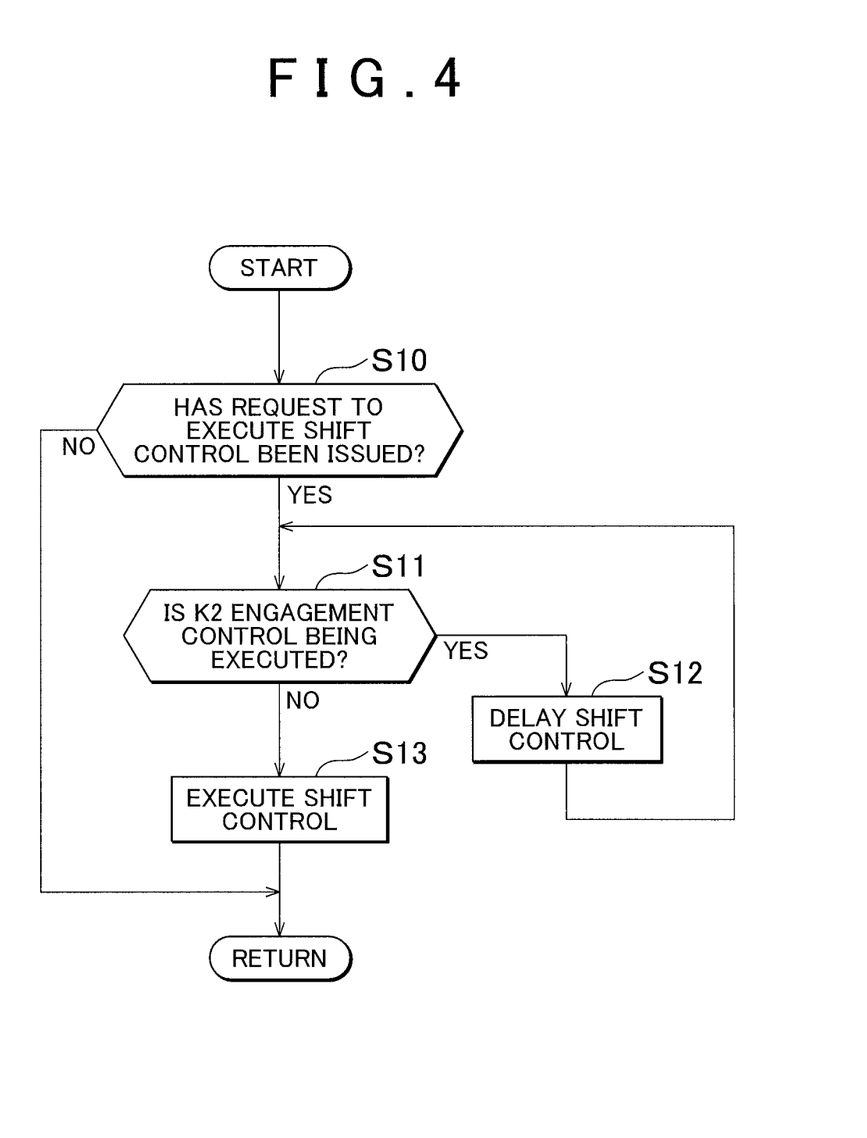
FIG. 4 is a first flowchart that shows the procedure of an ECU.

FIG. 4 is a flowchart that shows a procedure that is executed at the time when the ECU 100 executes shift control (rotation change control). This flowchart is repeatedly executed at predetermined intervals.

In step (hereinafter, step is abbreviated as S) S10, the ECU 100 determines whether a request to execute shift control has been issued. When a request to execute shift control has not been issued (NO in S10), the ECU 100 ends the process.

When a request to execute shift control has been issued (YES in S10), the ECU 100 determines in S11 whether K2 engagement control is being executed.

When K2 engagement control is being executed (YES in S11), the ECU 100 delays execution of shift control in S12. After that, the ECU 100 returns the process to S11, and continues a delay of execution of shift control until execution of K2 engagement control is completed. That is, in order to suppress overlapping execution of K2 engagement control and shift control, the ECU 100 preferentially executes K2 engagement control that was already being executed (was in the midst of execution), and does not execute shift control until K2 engagement control is completed.

When execution of K2 engagement control has completed or when K2 engagement control is not executed from the beginning (NO in S11), the ECU 100 advances the process to S13, and executes shift control.

Figure 5:
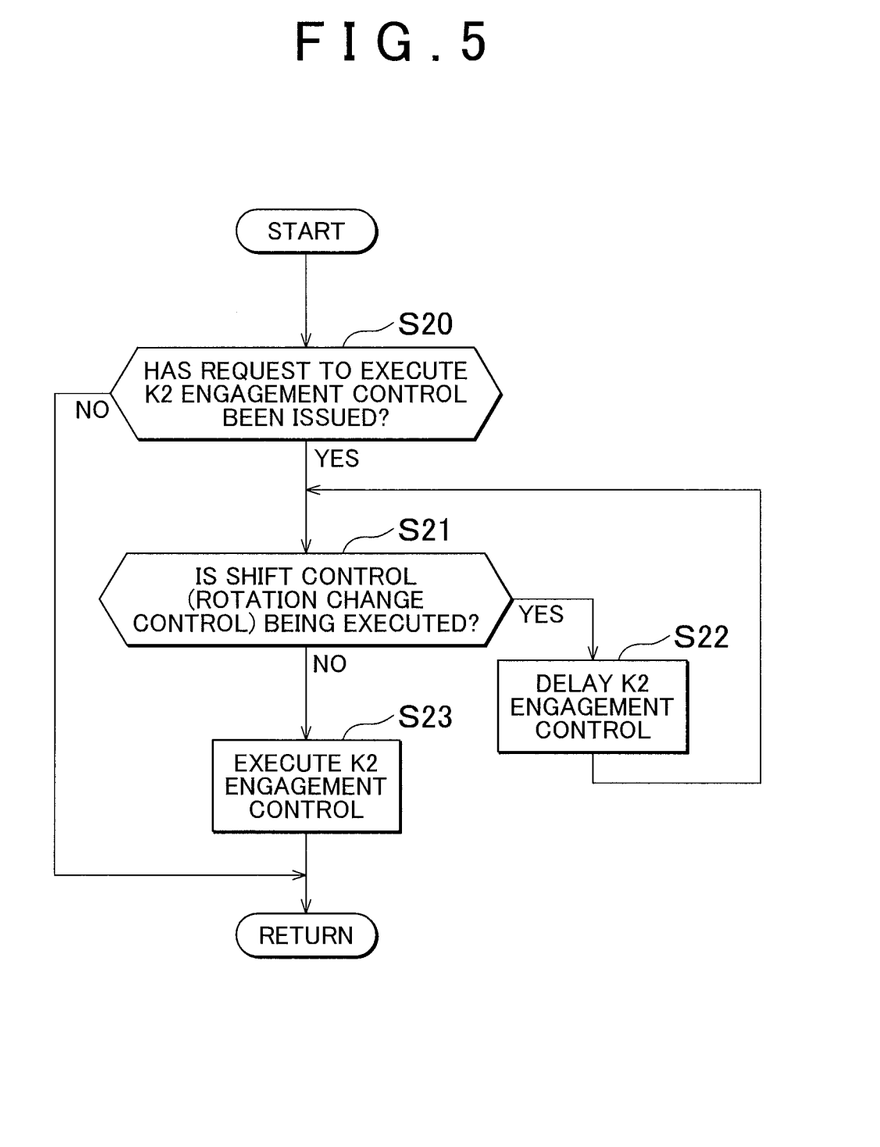
FIG. 5 is a second flowchart that shows the procedure of the ECU.

FIG. 5 is a flowchart that shows a procedure that is executed at the time when the ECU 100 executes K2 engagement control. This flowchart is repeatedly executed at predetermined intervals.

In S20, the ECU 100 determines whether a request to execute K2 engagement control has been issued. When a request to execute K2 engagement control has not been issued (NO in S20), the ECU 100 ends the process.

When a request to execute K2 engagement control has been issued (YES in S20), the ECU 100 determines in S21 whether shift control (rotation change control) is being executed.

When shift control is being executed (YES in S21), the ECU 100 delays execution of K2 engagement control in S22. After that, the ECU 100 returns the process to S21, and continues a delay of execution of K2 engagement control until execution of shift control is completed. That is, in order to suppress overlapping execution of K2 engagement control and shift control, the ECU 100 preferentially executes shift control that was already being executed (was in the midst of execution), and does not execute K2 engagement control until shift control is completed.

When execution of shift control has completed or when shift control is not executed from the beginning (NO in S21), the ECU 100 advances the process to S23, and executes K2 engagement control.

Figure 6:
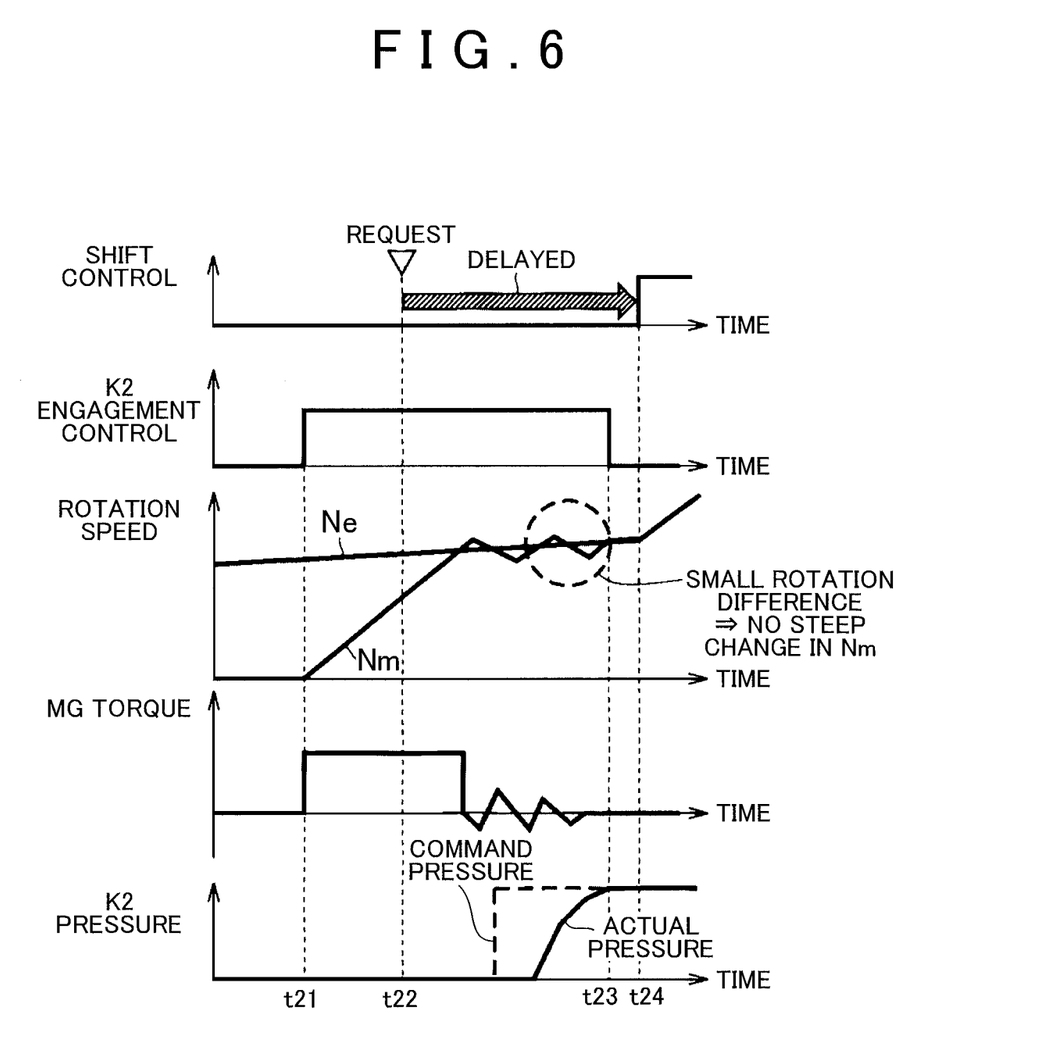
FIG. 6 is a time chart that shows an example of changes in MG rotation speed Nm, and the like, in the case where execution of shift control is delayed while K2 engagement control is being executed.

FIG. 6 is a time chart that shows an example of changes in MG rotation speed Nm, and the like, in the case where execution of shift control (rotation change control) is delayed while K2 engagement control is being executed. FIG. 6 illustrates downshift control as shift control.

When K2 engagement control is started at time t21, the MG rotation speed Nm begins to increase toward the engine rotation speed Ne under Nm synchronization control.

When a request to execute shift control has been issued at time t22 at which K2 engagement control is being executed, the start timing of shift control is not time t22, but the start timing is delayed to time t24 after time t23 at which K2 engagement control is completed. Thus, overlapping execution of shift control during execution of K2 engagement control is suppressed. Therefore, as compared to the case where shift control is overlappingly executed during execution of K2 engagement control, it is possible to execute Nm synchronization control in a state where the engine rotation speed Ne (the rotation speed of the rotary shaft 35) that is the target value of Nm synchronization control is stable, so it is possible to improve the controllability of Nm synchronization control. That is, it is possible to engage the clutch K2 in a state where the difference between the MG rotation speed Nm and the engine rotation speed Ne is small. As a result, the MG rotation speed Nm does not steeply change at the time of engagement of the clutch K2, so it is possible to suppress occurrence of the above-described engagement shock or overcurrent.

Figure 7:
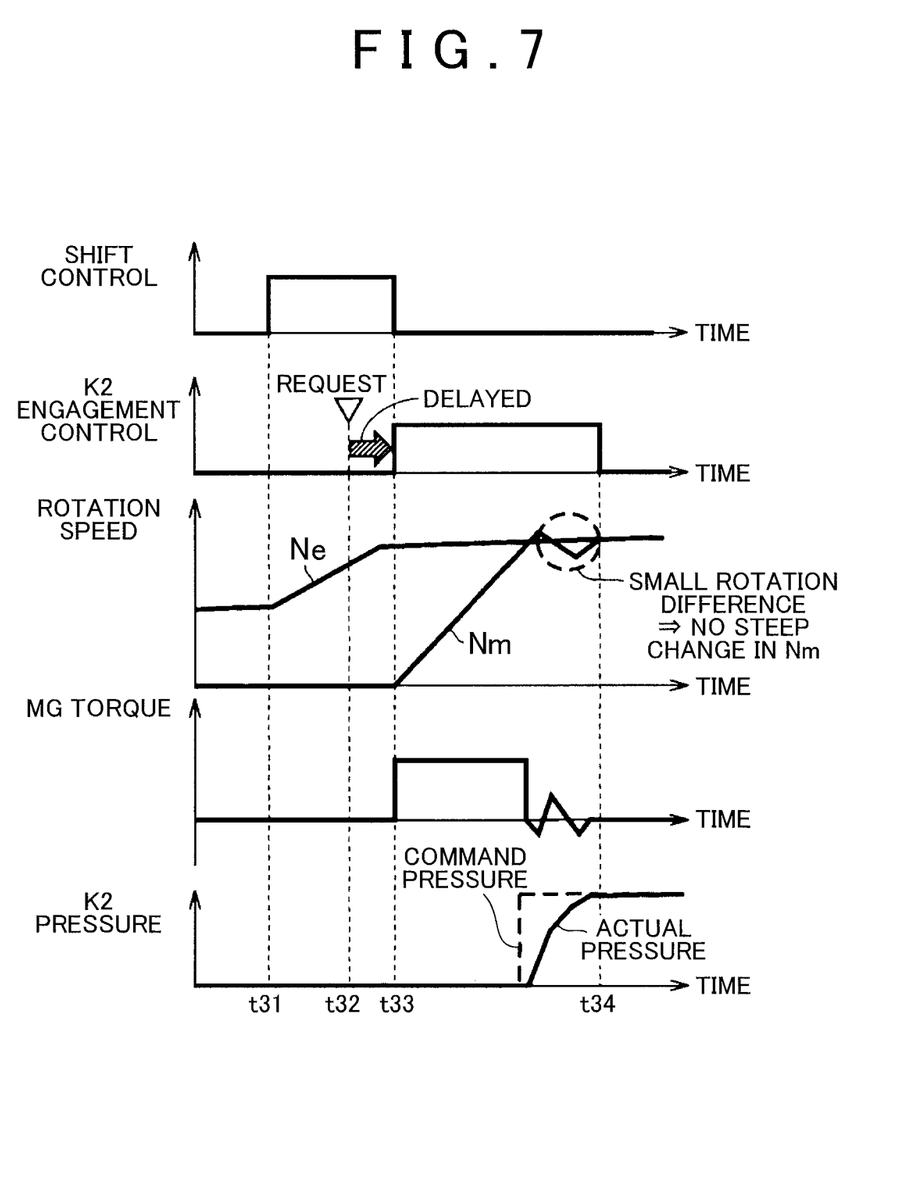
FIG. 7 is a time chart that shows an example of changes in MG rotation speed Nm, and the like, in the case where execution of K2 engagement control is delayed while shift control is being executed.

FIG. 7 is a time chart that shows an example of changes in MG rotation speed Nm, and the like, in the case where execution of K2 engagement control is delayed while shift control (rotation change control) is being executed. FIG. 7 also illustrates downshift control as shift control.

When downshift control is started at time t31, the engine rotation speed Ne begins to increase toward a downshifted synchronization rotation speed (a rotation speed that is determined by a downshifted speed ratio and a vehicle speed).

When a request to execute K2 engagement control has been issued at time t32 at which downshift control is being executed, the start timing of K2 engagement control is not time t32, but the start timing is delayed to time t33 after completion of downshift control. Thus, overlapping execution of K2 engagement control during execution of downshift control is suppressed, so it is possible to suppress occurrence of an engagement shock or overcurrent as in the case described with reference to FIG. 6.

As described above, the ECU 100 according to the present embodiment, when either one of K2 engagement control and shift control (rotation change control) is being executed, suppresses execution of the other one of K2 engagement control and shift control (rotation change control). Thus, the controllability of K2 engagement control (Nm synchronization control) is improved, so it is possible to suppress occurrence of an engagement shock or overcurrent at the time of engagement of the clutch K2.

The above-described embodiment may be, for example, modified as follows. In the above-described embodiment, shift control (control for changing the gear position of the automatic transmission 40) is described as rotation change control (control for changing the rotation speed of the rotary shaft 35).

However, by executing LU control (control for changing the state of the lockup clutch 34) as well, a slip amount of the torque converter 30 (a rotation speed difference between the pump impeller 31 and the turbine runner 32) changes, so the rotation speed of the rotary shaft 35 changes. Therefore, LU control may be set as rotation change control instead of or in addition to shift control. That is, when any one of K2 engagement control and LU control is being executed, execution of the other one of K2 engagement control and LU control may be suppressed.

Figure 8:
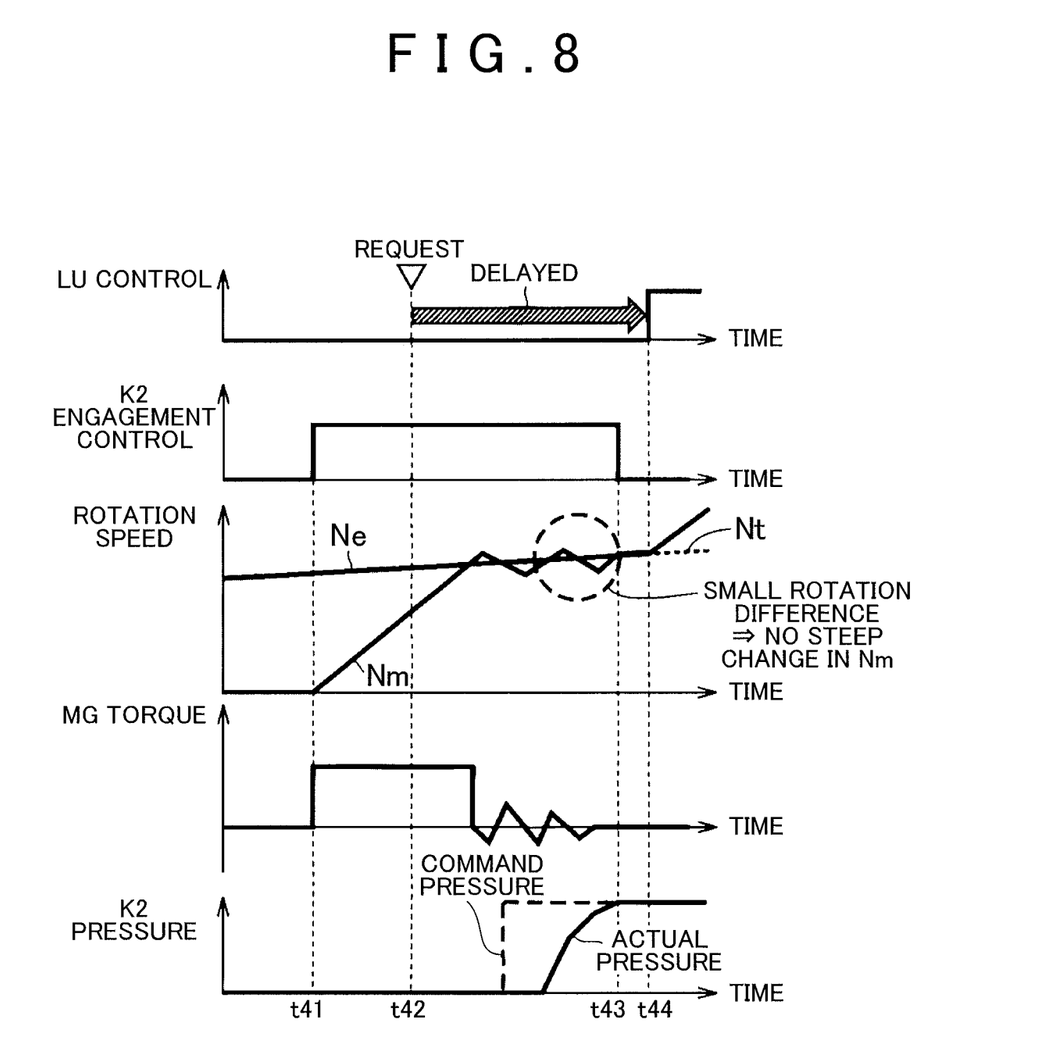
FIG. 8 is a time chart that shows an example of changes in MG rotation speed Nm, and the like, in the case where execution of LU control is delayed while K2 engagement control is being executed.

FIG. 8 is a time chart that shows an example of changes in MG rotation speed Nm, and the like, in the case where the ECU 100 according to the present alternative embodiment delays execution of LU control while K2 engagement control is being executed. FIG. 8 illustrates the case where the state of the lockup clutch 34 is changed from the engaged state to the released state in LU control.

When K2 engagement control is started at time t41, the MG rotation speed Nm begins to increase toward the engine rotation speed Ne under Nm synchronization control.

When a request to execute LU control has been issued at time t42 at which K2 engagement control is being executed, the start timing of LU control is not time t42, but the start timing is delayed to time t44 after time t43 at which K2 engagement control is completed. Thus, overlapping execution of LU control during execution of K2 engagement control is suppressed, so it is possible to suppress occurrence of an engagement shock or overcurrent as in the case described with reference to FIG. 6.

Figure 9:
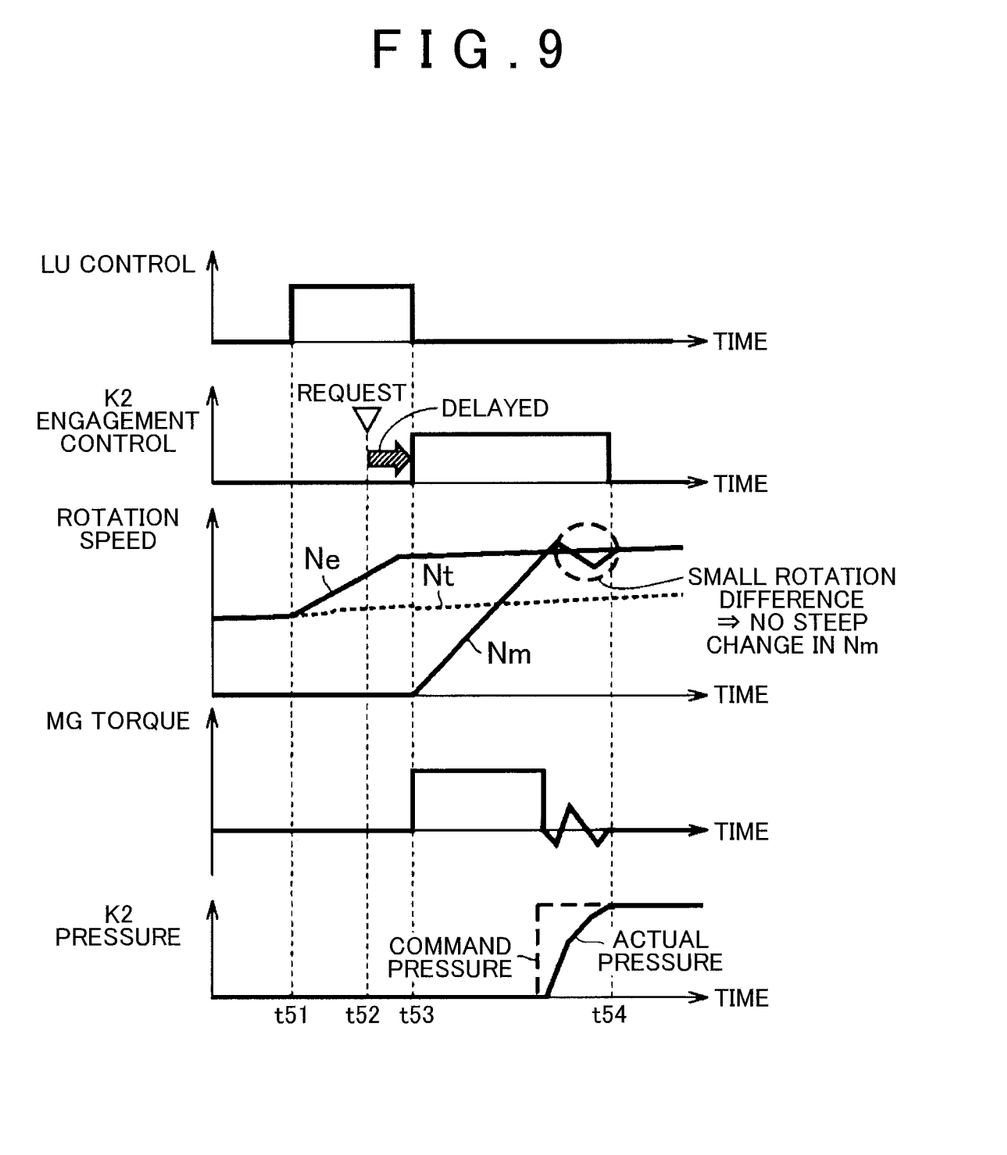
FIG. 9 is a time chart that shows an example of changes in MG rotation speed Nm, and the like, in the case where execution of K2 engagement control is delayed while LU control is being executed.

FIG. 9 is a time chart that shows an example of changes in MG rotation speed Nm, and the like, in the case where execution of K2 engagement control is delayed while LU control is being executed. FIG. 9 also illustrates the case where the state of the lockup clutch 34 is changed from the engaged state to the released state in LU control.

When LU control is started at time t51, a slip of the torque converter 30 is allowed as a result of a change of the lockup clutch 34 into the released state, and the engine rotation speed Ne begins to increase over the turbine rotation speed Nt.

When a request to execute K2 engagement control has been issued at time t52 at which LU control is being executed, the start timing of K2 engagement control is not time t52, but the start timing is delayed to time t53 after completion of LU control. Thus, overlapping execution of K2 engagement control during execution of LU control is suppressed, so it is possible to suppress occurrence of an engagement shock or overcurrent as in the case described with reference to FIG. 6.

Engine torque-up control may be set as rotation change control instead of at least one of the above-described shift control and LU control. In the present alternative embodiment, engine torque-up control means control for increasing the torque of the engine 10 such that the amount of increase in the torque of the engine 10 becomes larger than or equal to a predetermined value in response to an increase in accelerator operation amount, or the like.

In a state where the lockup clutch 34 is released (in an LU off state), there is a concern that the engine rotation speed Ne steeply increases as a result of execution of engine torque-up control.

Figure 10:
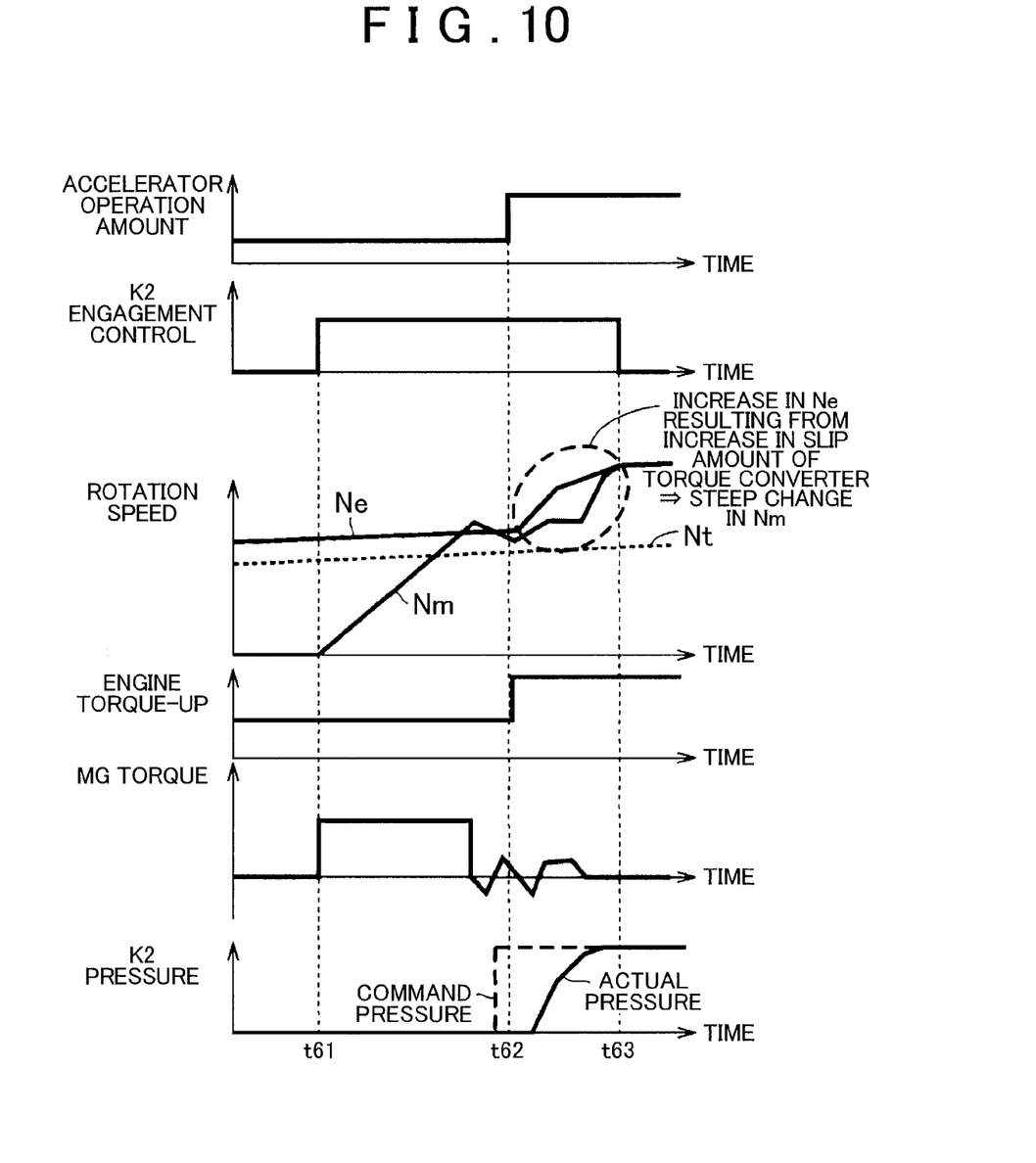
FIG. 10 is a second time chart that shows a comparative embodiment.

FIG. 10 is a time chart that shows an example of changes in MG rotation speed Nm, and the like, in the case where engine torque-up control is executed during execution of K2 engagement control in the LU off state as a comparative embodiment. When K2 engagement control is started at time t61, the MG rotation speed Nm begins to increase toward the engine rotation speed Ne under Nm synchronization control. However, when engine torque-up control is executed as a result of an increase in accelerator operation amount at time t62 at which K2 engagement control is being executed, a slip amount of the torque converter 30 increases, the engine rotation speed Ne steeply increases, and the difference between the MG rotation speed Nm and the engine rotation speed Ne increases. As a result, there is a concern that the MG rotation speed Nm steeply changes at the time when the clutch K2 is engaged and then the above-described engagement shock or overcurrent occurs.

In a state where the lockup clutch 34 is engaged (in an LU on state) as well, when the drive wheels 50 slip on a road surface as a result of execution of engine torque-up control, there is a concern that the engine rotation speed Ne steeply increases.

Figure 11:
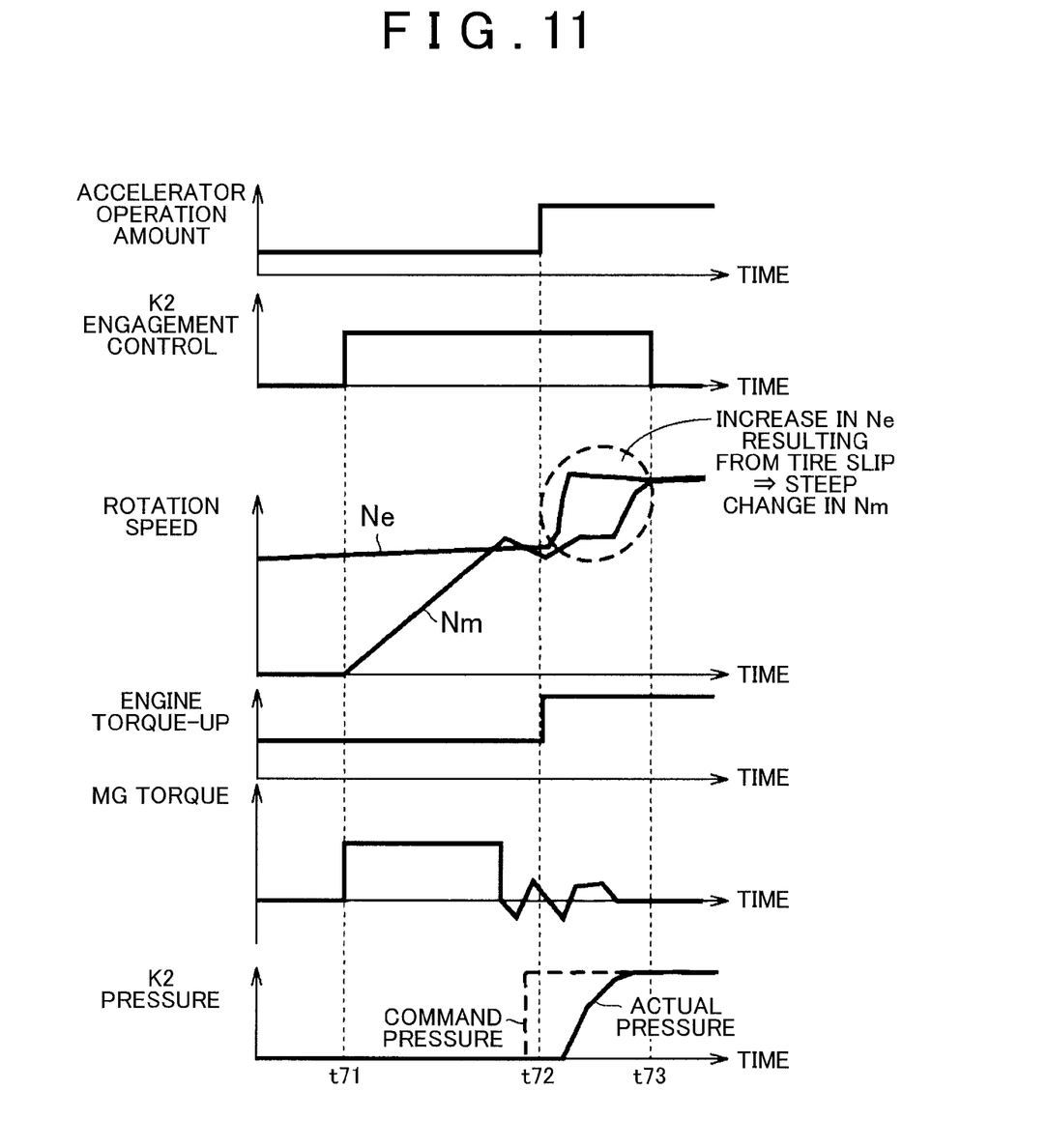
FIG. 11 is a third time chart that shows a comparative embodiment.

FIG. 11 is a time chart that shows changes in MG rotation speed Nm, and the like, in the case where engine torque-up control is executed while K2 engagement control is being executed in the LU on state as a comparative embodiment. When K2 engagement control is started at time t71, the MG rotation speed Nm begins to increase toward the engine rotation speed Ne under Nm synchronization control. However, when the drive wheels 50 slip on a road surface as a result of execution of engine torque-up control with an increase in accelerator operation amount at time t72 at which K2 engagement control is being executed, the engine rotation speed Ne steeply increases, and the difference between the MG rotation speed Nm and the engine rotation speed Ne increases. As a result, there is a concern that the MG rotation speed Nm steeply changes at the time when the clutch K2 is engaged and then the above-described engagement shock or overcurrent occurs.

When either one of K2 engagement control and engine torque-up control is being executed, execution of the other one of K2 engagement control and engine torque-up control may be suppressed.

Figure 12:
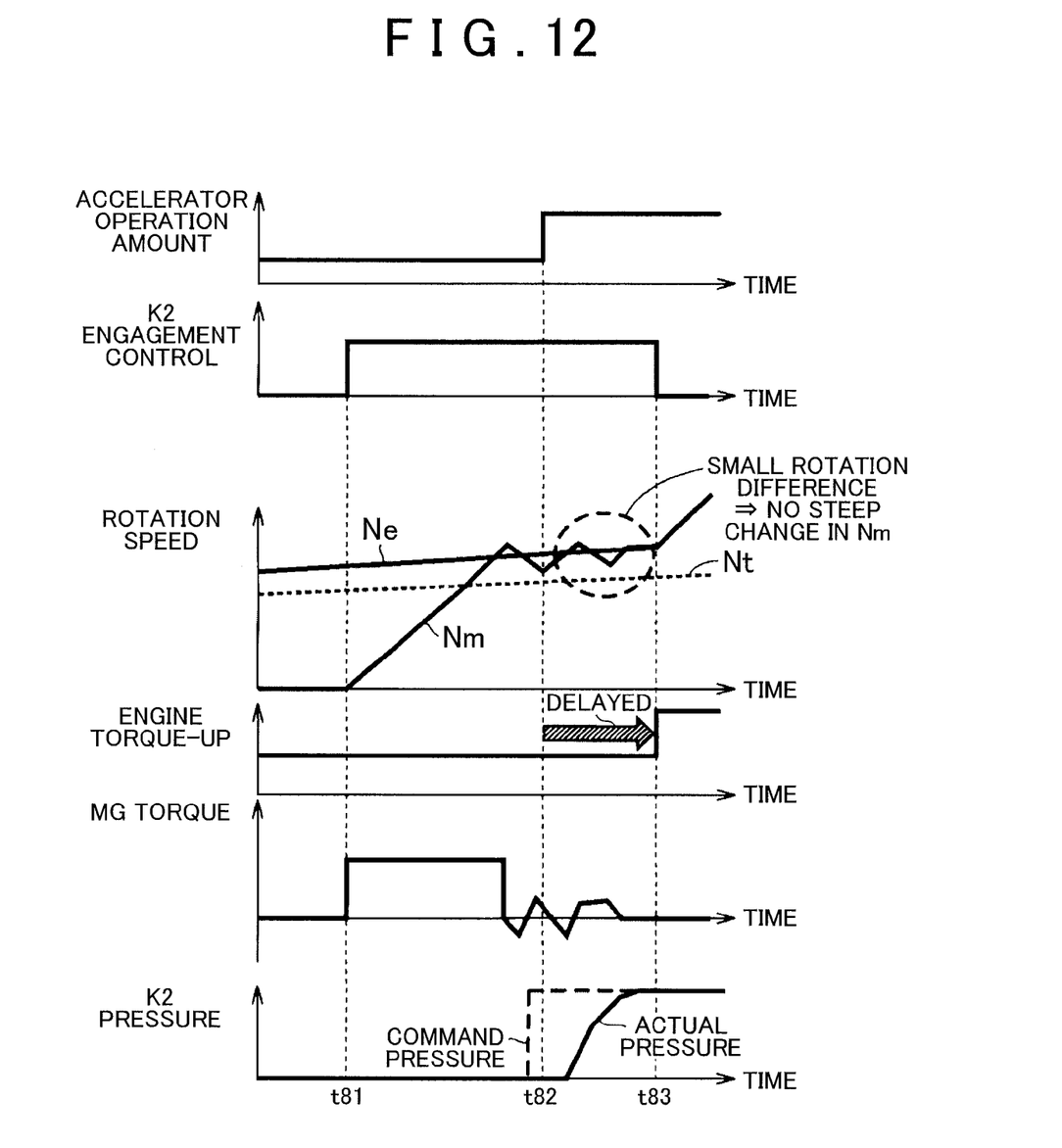
FIG. 12 is a time chart that shows an example of changes in MG rotation speed, and the like, in the case where execution of engine torque-up control is delayed while K2 engagement control is being executed.

FIG. 12 is a time chart that shows an example of changes in MG rotation speed Nm, and the like, in the case where the ECU 100 according to the present alternative embodiment delays execution of engine torque-up control while K2 engagement control is being executed. FIG. 12 illustrates the case where the lockup clutch 34 is released.

When K2 engagement control is started at time t81, the MG rotation speed Nm begins to increase toward the engine rotation speed Ne under Nm synchronization control.

When a request to execute engine torque-up control has been issued as a result of an increase in accelerator operation amount at time t82 at which K2 engagement control is being executed, the start timing of engine torque-up control is not time t82, but the start timing is delayed to time t83 at which K2 engagement control is completed. Thus, overlapping execution of engine torque-up control during execution of K2 engagement control is suppressed, so it is possible to suppress occurrence of an engagement shock or overcurrent as in the case described with reference to FIG. 6.

Control for reducing the torque of the engine 10 such that the amount of reduction in the torque of the engine 10 becomes larger than or equal to a predetermined value in response to a decrease in accelerator operation amount, or the like, (engine torque-down control) may be set as rotation change control instead of or in addition to the above-described engine torque-up control.

In the above-described embodiment and first and second alternative embodiments, it is assumed that K2 engagement control is executed in a state where the engine 10 is connected to the rotary shaft 35 (in a state where the clutch K0 is engaged).

However, K2 engagement control may be executed in a state where the engine 10 is disconnected from the rotary shaft 35 (in a state where the clutch K0 is released). In this case, shift control and LU control may be set as rotation change control. That is, in a state where the engine 10 is disconnected from the rotary shaft 35 as well, the rotation speed of the rotary shaft 35 can change under shift control and LU control. Therefore, when K2 engagement control is executed in a state where the engine 10 is disconnected from the rotary shaft 35, shift control and LU control may be set as rotation change control.

The embodiments described above are illustrative and not restrictive. Various modifications are possible.

What is claimed is:

1. A drive system for a hybrid vehicle, the drive system comprising:
   an engine;
   a motor;
   a rotary shaft;
   an engine disconnect clutch provided between the rotary shaft and the engine;
   a motor disconnect clutch provided between the rotary shaft and the motor;
   an automatic transmission provided between the rotary shaft and a drive wheel of the hybrid vehicle; and
   an electronic control unit configured to
   (i) execute engagement control by controlling the motor and the motor disconnect clutch so that the motor disconnect clutch switches from a disengaged state to an engaged state while causing a rotation speed of the motor to become synchronized with a rotation speed of the rotary shaft,
   (ii) execute rotation change control which causes a rotation speed of the rotary shaft to change, and
   (iii) while either one of the engagement control and the rotation change control is being executed, when a request to execute the other one of the engagement control and the rotation change control has been issued, (a) delay a start timing of the other one of the engagement control and the rotation change control until execution of the one of the engagement control and the rotation change control is completed, and then (b) start execution of the other one of the engagement control and the rotation change control after execution of the one of the engagement control and the rotation change control has been completed.

2. The drive system according to claim 1, wherein the rotation change control includes control that changes a speed ratio of the automatic transmission.

3. The drive system according to claim 1, wherein the rotation change control includes control that changes an engagement state of a lockup clutch provided between the rotary shaft and the automatic transmission.

4. The drive system according to claim 1, wherein the rotation change control includes control that sets an amount of change in torque of the engine to a predetermined value or a value larger than the predetermined value in a state where the engine disconnect clutch is engaged.

5. A drive system for a hybrid vehicle, the drive system comprising:
   an engine;
   a motor;
   a rotary shaft;
   an engine disconnect clutch provided between the rotary shaft and the engine;
   a motor disconnect clutch provided between the rotary shaft and the motor;
   an automatic transmission provided between the rotary shaft and a drive wheel of the hybrid vehicle; and
   an electronic control unit configured to
   (i) execute engagement control by controlling the motor and the motor disconnect clutch so that the motor disconnect clutch switches from a disengaged state to an engaged state while causing a rotation speed of the motor to become synchronized with a rotation speed of the rotary shaft,
   (ii) execute rotation change control which causes a rotation speed of the rotary shaft to change, and
   (iii) while the engagement control is being executed, when a request to execute the rotation change control has been issued, (a) delay a start timing of the rotation change control.

6. The drive system according to claim 5, wherein the electronic control unit delays the start timing of the rotation change control until execution of the engagement control has been completed.

7. The drive system according to claim 5, wherein
   the rotation change control includes control that changes a speed ratio of the automatic transmission.

8. The drive system according to claim 5, wherein
   the rotation change control includes control that changes an engagement state of a lockup clutch provided between the rotary shaft and the automatic transmission.

9. The drive system according to claim 5, wherein
   the rotation change control includes control that sets an amount of change in torque of the engine to a predetermined value or a value larger than the predetermined value in a state where the engine disconnect clutch is engaged.

10. A drive system for a hybrid vehicle, the drive system comprising:
    an engine;
    a motor;
    a rotary shaft;
    an engine disconnect clutch provided between the rotary shaft and the engine;
    a motor disconnect clutch provided between the rotary shaft and the motor;
    an automatic transmission provided between the rotary shaft and a drive wheel of the hybrid vehicle; and
    an electronic control unit configured to
    (i) execute engagement control by controlling the motor and the motor disconnect clutch so that the motor disconnect clutch switches from a disengaged state to an engaged state while causing a rotation speed of the motor to become synchronized with a rotation speed of the rotary shaft,
    (ii) execute rotation change control which causes a rotation speed of the rotary shaft to change, and
    (iii) while the rotation change control is being executed, when a request to execute the engagement control has been issued, (a) delay a start timing of the engagement control.

11. The drive system according to claim 10, wherein the electronic control unit delays the start timing of the engagement control until execution of the rotation change control has been completed.

12. The drive system according to claim 10, wherein
    the rotation change control includes control that changes a speed ratio of the automatic transmission.

13. The drive system according to claim 10, wherein
    the rotation change control includes control that changes an engagement state of a lockup clutch provided between the rotary shaft and the automatic transmission.

14. The drive system according to claim 10, wherein
    the rotation change control includes control that sets an amount of change in torque of the engine to a predetermined value or a value larger than the predetermined value in a state where the engine disconnect clutch is engaged.

* * * * *